United States Patent [19]

Vermaat et al.

[11] Patent Number: 4,649,989
[45] Date of Patent: Mar. 17, 1987

[54] DEVICE FOR TESTING AND/OR REPAIRING STEAM GENERATOR TUBES

[75] Inventors: Huibrecht P. Vermaat, AV Rockanje, Netherlands; Heiko Förch, Otterstadt; Lothar Mehr, Lampertheim, both of Fed. Rep. of Germany

[73] Assignee: Brown Boveri Reaktor GmbH, Mannheim, Fed. Rep. of Germany

[21] Appl. No.: 569,563

[22] Filed: Jan. 9, 1984

[30] Foreign Application Priority Data

Jan. 8, 1983 [DE]  Fed. Rep. of Germany ....... 3300460

[51] Int. Cl.$^4$ .............................................. B25J 9/04
[52] U.S. Cl. .................................... 165/11.2; 165/76; 294/94; 403/16; 403/369; 279/2 R; 414/744 R; 414/749
[58] Field of Search .............................. 165/11 A, 76; 414/744 R, 749, 750; 294/94, 96, 86.25; 408/16, 369, 370; 279/2 R; 408/79, 82

[56]  References Cited

U.S. PATENT DOCUMENTS

| | | | |
|---|---|---|---|
| 1,457,139 | 5/1923 | Bell et al. | 294/86.25 |
| 1,728,136 | 9/1929 | Power | 294/86.25 |
| 1,917,135 | 7/1933 | Littell | 294/86.25 |
| 2,184,681 | 12/1939 | Osmun et al. | 294/96 |
| 2,953,406 | 9/1960 | Young | 294/86.25 |
| 3,698,756 | 10/1972 | Groves | 294/96 |
| 3,889,820 | 6/1975 | Ranger | 414/750 |
| 4,070,561 | 1/1978 | Shunichi et al. | 165/11 A |
| 4,148,403 | 4/1979 | Riffe | 165/76 |
| 4,205,940 | 6/1980 | Golick | 165/11 A |
| 4,438,805 | 3/1984 | Gugel | 165/11 A |
| 4,494,907 | 1/1985 | Coussau et al. | 414/749 |

FOREIGN PATENT DOCUMENTS 2291686  6/1976  France ............................ 279/2 R Primary Examiner—Michael Koczo
Assistant Examiner—John K. Ford
Attorney, Agent, or Firm—Herbert L. Lerner; Laurence A. Greenberg

[57]  ABSTRACT

A steam generator having a steam generator chamber, a tube plate bordering the chamber, tubes terminating in the tube plate being accessible through the steam generator chamber, a tubular column in the steam generator chamber having an end facing toward the tube plate, and a swivel arm extended from the tubular column being movable parallel to the tube plate for carrying a device for testing and/or repairing the steam generator tubes, includes a clamping element for positioning the tubular column relative to a tube of the tube plate, and a coupling being detachable from outside the steam generator chamber connecting the clamping element to the tubular column, the clamping element including a drive element disposed in the tubular column, an expansion plunger connected to the drive element for axially inserting the expansion plunger partially into a tube, an expansion sleeve formed of separate clamping jaws for engaging the tubes, the clamping jaws having ends being insertible into a tube, and a holding element movable by the expansion plunger for engaging the ends of the clamping jaws, the expansion plunger being axially movable toward the tubular column by the drive element in a opening motion causing the clamping jaws to release the tube, and the expansion plunger being axially movable away from the tubular column in a closing motion causing the clamping jaws to engage the tube.

5 Claims, 2 Drawing Figures

DEVICE FOR TESTING AND/OR REPAIRING STEAM GENERATOR TUBES

BACKGROUND OF THE INVENTION

1. Field of the Invention

The invention relates to a device for testing and/or repairing steam generator tubes which terminate in a tube plate and are accessible through a steam generating chamber, including a tubular column, means for positioning the column with respect to at least one tube of the tube plate, and means for carrying testing or repairing apparatus.

2. Description of the Prior Art

In such a device, the positioning means may inhibit the motion of the carrying means and may become jammed against the tube or tube plate, making it difficult to free the device, requiring operating personnel to enter the chamber.

SUMMARY OF THE INVENTION

It is accordingly an object of the invention to provide a device for testing and/or repairing steam generator tubes, which overcomes the hereinafore-mentioned disadvantages of the heretofore-known devices of this general type, which permits the uninhibited motion of the carrying means and freeing of the positioning means, in a simple way which is not dangerous for operating personnel.

With the foregoing and other objects in view there is provided, in accordance with the invention, a steam generator having a steam generator chamber, a tube plate bordering the chamber, tubes terminating in the tube plate being accessible through the steam generator chamber, a tubular column in the steam generator chamber having an end facing toward the tube plate, and a swivel arm extended from the tubular column being movable parallel to the tube plate for carrying a device for testing and/or repairing the steam generator tubes, comprising a clamping element for positioning the tubular column relative to a tube of the tube plate, and a coupling being detachable from outside the steam generator chamber connecting the clamping element to the tubular column, the clamping element including a drive element disposed in the tubular column, an expansion plunger connected to the drive element for axially inserting the expansion plunger partially into a tube, an expansion sleeve formed of separate clamping jaws for engaging the tubes, the clamping jaws having ends being insertible into a tube, and a holding element movable by the expansion plunger for engaging the ends of the clamping jaws, the expansion plunger being axially movable toward the tubular column by the drive element in an opening motion causing the clamping jaws to release the tube in a relaxed position, and the expansion plunger being axially movable away from the tubular column in a closing motion causing the clamping jaws to engage the tube.

The proposed construction increases the reliability of the device, improves its operation, and therefore avoids radiation damage to operating personnel.

In accordance with another feature of the invention, the drive element is a compressed air motor, and the clamping element includes a coupling flange connected to the tubular column by the coupling, the coupling flange including a collar extended into the tubular column carrying the compressed air motor.

This structure enables the mounting of the compressed air motor and the connection between the clamping element and the base column to be integrated in an especially advantageous way.

In accordance with a further feature of the invention, the expansion plunger has a thread formed thereon, the clamping element includes another holding element holding the expansion sleeve, a drive shaft rotated by the drive element, a sleeve for transforming the rotary motion of the drive shaft into the axial motion of the expansion plunger, the sleeve having an internal thread engaging the thread formed on the plunger, and the sleeve having a polygonal portion connected to the drive shaft, and a pin passing through the expansion plunger between the internal thread of the sleeve and the expansion sleeve, the pin having ends projecting beyond the periphery of the expansion plunger being guided in a slot formed in the other holding element.

The advantage of this construction is that after the coupling connection between the column and the clamping element has been detached, the polygonal portion is freely accessible, and the clamping element can be manually removed with the aid of a tool that can be operated by a rod through the manhole of the steam generating chamber.

In accordance with an added feature of the invention, the drive element is a compressed air motor, and the clamping element includes a coupling flange connected to the tubular column by the coupling, the coupling flange includes a collar extended into the tubular column carrying the compressed air motor, and including a nut connecting the other holding element to the coupling flange, the nut extending beyond the slot formed in the other holding element. The nut prevents the pin which perforates the expansion plunger from falling out.

In accordance with a concomitant feature of the invention, the clamping jaws have outer tapered surfaces with a given inclination, the holding element is connected to the expansion plunger for insertion into a tube, the holding element has a maximum outer diameter which is smaller than the inner diameter of a tube, and the holding element has a region overlapping the ends of the clamping jaws having an inner tapered surface having the given inclination.

Besides its retrieving function for the expansion sleeve, the holding element also has an additional centering function when the clamping element is inserted into a tube of the tube plate.

Other features which are considered as characteristic for the invention are set forth in the appended claims.

Although the invention is illustrated and described herein as embodied in a device for testing and/or repairing steam generator tubes, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings, in which.

DESCRIPTION OF THE PREFERRED EMBODIMENT

Figure 1:
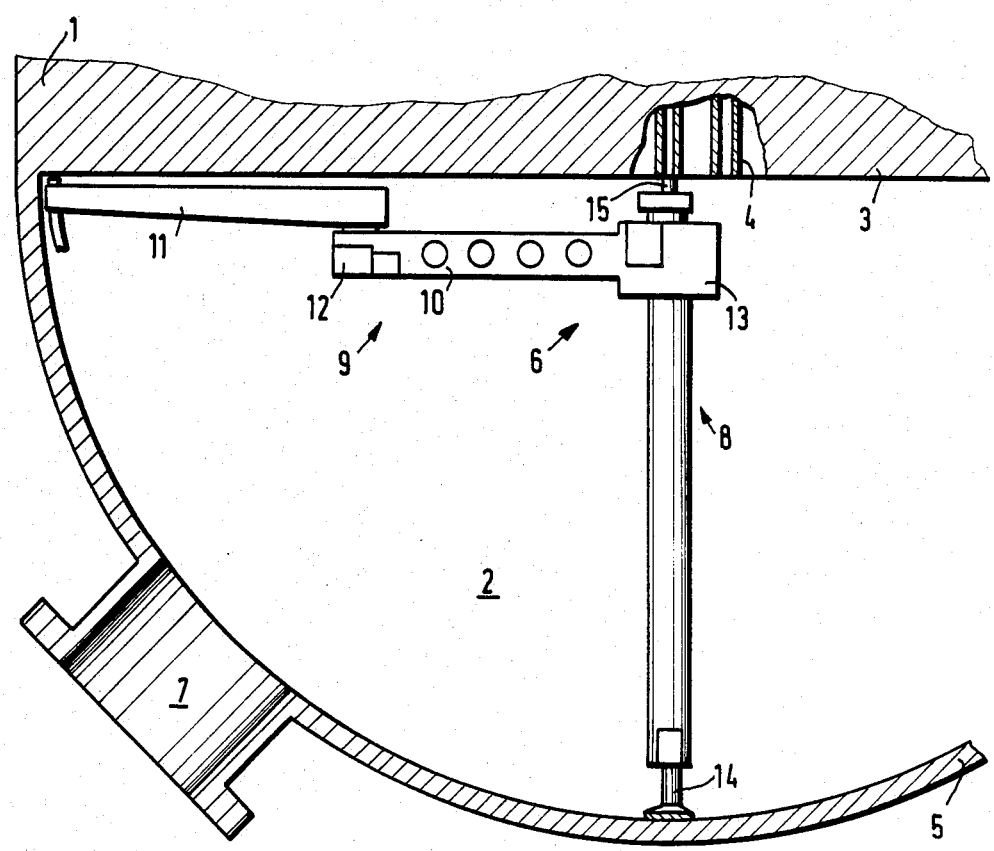
FIG. 1 is a fragmentary, diagrammatic, partly cross-sectional view of a steam generator chamber with the testing device of the invention disposed therein.

Referring now to the figures of the drawing in detail and first particularly to FIG. 1 thereof, there is seen a steam generator chamber 2 of a steam generator 1 of a nuclear power plant, which is not further described. A great number of tubes 4 terminate in a tube plate 3, which encloses the chamber together with a hemispherical bottom 5. A device 6 for testing and/or repairing the tubes 4 in the tube plate 3, is placed into the chamber 2 through a manhole 7. The device 6 is formed of a tubular column 8, and a swivel arm 9 which extends from the column 8. The swivel arm is formed of a main arm 10 and a device carrier 11, which can be moved relative to each other by a drive 12. The whole swivel arm can be turned and moved in axial direction relative to the column 8, with the aid of a combined lifting and rotating drive 13. A clamping element 15, which is explained in detail with respect to FIG. 2, serves to position and arrest the device 6, which is then braced against the hemispherical bottom 5 by a foot 14, that is incorporated into and vertically movable in, the column 8.

Figure 2:
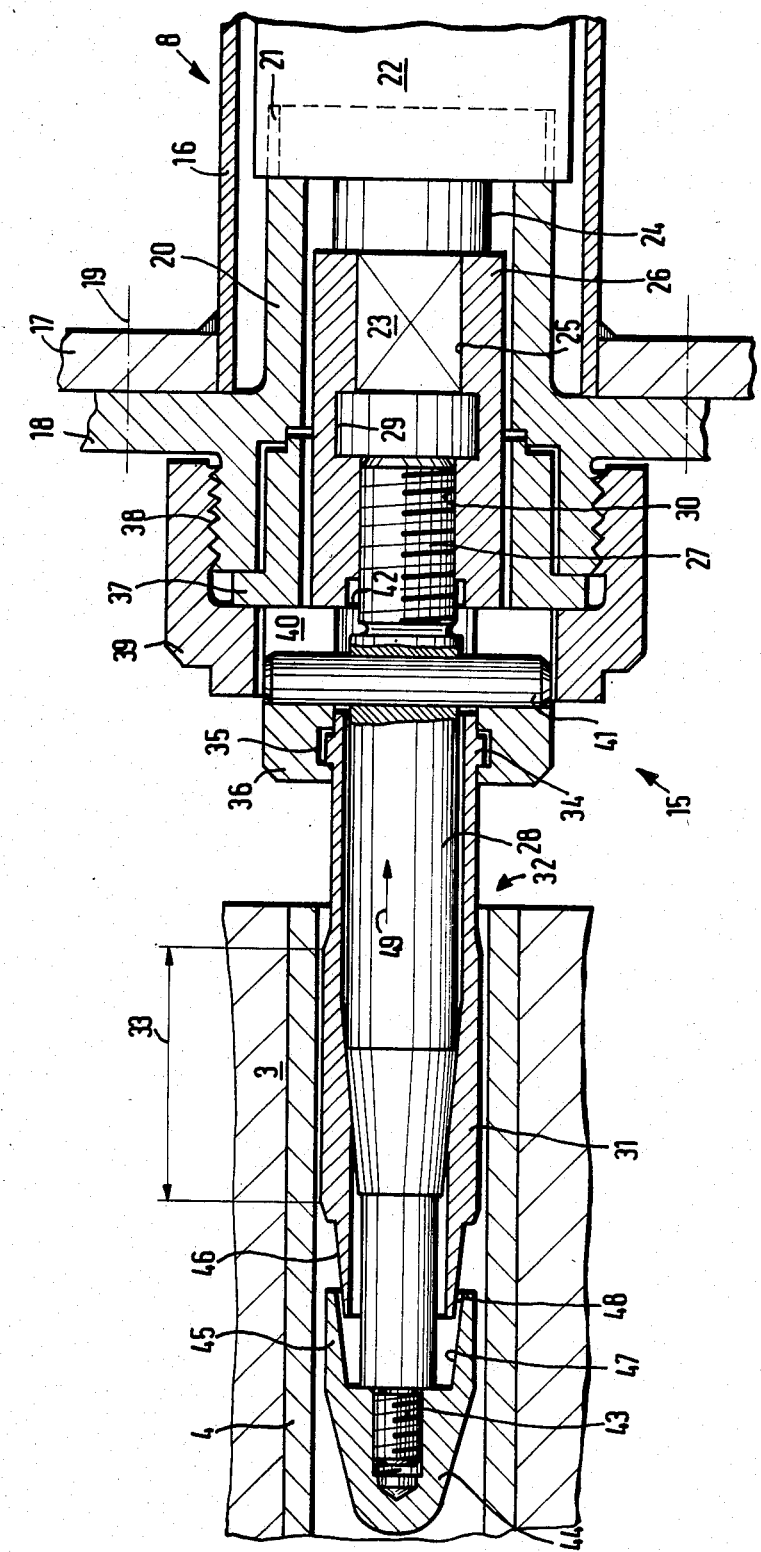
FIG. 2 is a fragmentary cross-sectional view of the clamping or tensioning element of the device on an enlarged scale and rotated counter clockwise 90°, as compared to FIG. 1.

FIG. 2 shows the clamping or tensioning element 15 on a larger scale. The column 8, which is essentially formed of a square tube 16 having an over-all dimension of 40 mm and a wall thickness of 1.5 mm, is welded at the end thereof pointing toward the tube plate 3, to a coupling flange 17. The coupling flange 17 forms a detachable coupling connection 19 with a coupling flange 18 of the clamping element 15. This coupling connection can be detached from outside the chamber 2. A collar 20 of the coupling flange 18 extends into the column 8 and carries a compressed air motor 22, which is also disposed in the hollow interior of the column 8, through a threaded connection 21. A drive shaft 24 of the compressed air motor 22 is provided with a square hub 23 at its free end which is engaged in an internal square portion 25 of a sleeve 26. The sleeve 26 is provided at its other end with a thread 30 which receives a threaded portion 27 of an expansion finger plunger 28. The sleeve 26 also has a recess 29, which separates the internal square portion 25 from the thread 30.

In this manner, the rotation of the drive shaft 24 of the compressed air motor 22 is converted by means of the sleeve 26 into a back and forth motion of the expansion plunger 28, due to the relative rotation of the threaded portion 27 and the thread 30. It is possible for the clamping element 15 to remain in the tensioned position because of a failure of the expansion plunger drive or because of some other malfunction. If this occurs, then after the coupling connection 19 between column 8 and the clamping element is detached, the sleeve 26 can be rotated manually through the manhole by a tool which is provided with a square end portion, so that the clamping element can be loosened. The coupling connection between the column and the clamping element may be constructed in the form of a quick connection coupling such as a bayonet coupling, which can also be detached from outside the chamber through the manhole. An expansion sleeve or collet 32 which is formed by three jaws 31, surrounds the central region of the expansion plunger 28. The expansion sleeve is formed of individual jaws, so that it makes an optimal contact with the interior surface of a tube 4 in a clamping region 33, even if the inside of the tube is out of round. The end of the jaws 31 toward the sleeve 26 are provided with a flange 34 which is retained in an annular groove 35 formed in a holding element 36. The flange 34 has about 1 mm play in the annular groove 35 of the holding element 36, in the axial and radial directions, so that the holding element 36 holds the jaws 31 of the expansion sleeve 32 in place with some play. A shoulder 37 of the holding element 36 is clamped with a nut 39 which is screwed onto a threaded portion 38 of the coupling flange 18. The wall of the holding element 36 is perforated by two oppositely positioned slots 40 between the shoulder 37 and the annular groove 35. A pin 41 which passes through the expansion plunger 28 is disposed in the slots 40. This pin also moves axially, as the expansion plunger 28 moves, and prevents a rotation of the expansion plunger 28 because of its retention in the slots 40. The nut 39 is constructed in such a way that it extends over the slot 40, and thereby prevents the pin 41 from falling out from its position. The length of the slot must be at least as long as the desired motion or stroke of the expansion plunger. The recesses 29 and another recess 42 in the sleeve 26 are necessary for the unrestricted axial motion of the plunger 28. The end of the expansion plunger 28 toward the tube plate 3, has a threaded portion 43 which carries an additional holding element 44 for the clamping sleeve 32. A collar 45 of the element 44 has a tapered inner surface which engages the end region of the jaws 31 of the expansion sleeve 32. For this reason, the jaws 31 are provided with an outer conically tapered surface 46 having the same inclination. In the clamping position of the clamping element 15 shown in FIG. 2, an annular gap of about 1 mm exists between the inner conically tapered surface 47 of the holding element 44 and the outer conically tapered surface 46 of the clamping sleeve. If the plunger 28 moves into the opening position in the direction of an arrow 49, the holding element 44 must press the jaws 31 radially inward, thereby assuring the separation of the clamping sleeve 32 from the inner wall surface of the tube 4. The taper connection between the clamping sleeve 32 and the plunger 28 does not inhibit this operation, because it is also loosened during the opening stroke of the plunger 28. Thus, the column 8 can be removed from the chamber 2 together with the clamping element 15 without difficulty. If the clamping element 15 is again introduced into a tube of the tube plate 3, the holding element 44 pointing toward the tube plate performs an additional function. Because of its conical shape and rounded point and because of the fact that its outer diameter which is about 1 mm less than the inner diameter of the tube, the holding element 44 also serves to facilitate the insertion of the device into the tubes.

What is claimed is:

1. In a steam generator having a steam generator chamber, a tube plate bordering the chamber, tubes terminating in the tube plate, means for providing access to the tubes through the steam generator chamber, a tubular column in the steam generator chamber having an end facing toward the tube plate, a swivel arm extended from the tubular column including means permitting movement of the swivel arm parallel to the tube plate and means for carrying devices for testing and repairing the steam generator tubes, and a clamping element including means for positioning the tubular column relative to a tube of the tube plate, the improvement comprising a coupling means connecting the clamping element to the tubular column including means for detaching said coupling from outside the steam generator chamber said clamping element including, an expansion plunger connected to the clamping element, an expansion sleeve formed of separate clamping jaws disposed outside said expansion plunger having ends inserted into a tube, a holding element connected to said expansion plunger means disposed in the tubular column and connected to said expansion plunger for axially moving said expansion plunger away from said tubular column and partially into a tube in a closing motion, means for causing said ends of said clamping jaws to engage the tube during the closing motion, means for axially moving said expansion plunger toward the tubular column in an opening motion, means for causing said clamping jaws to release the tube during the opening motion, and means for causing said holding element to engage said ends of said clamping jaws during the opening motion.

2. Steam generator according to claim 1, wherein said axially moving means comprises a compressed air motor, and the clamping element includes a coupling flange connected to the tubular column by said coupling means, said coupling flange including a collar extended into the tubular column carrying said compressed air motor.

3. Steam generator according to claim 1, wherein the expansion plunger has a thread formed thereon, said clamping element includes another holding element holding said expansion sleeve, said means for axially moving said expansion plunger including a drive shaft rotated by a drive means, a sleeve having means for transforming the rotary motion of said drive shaft into the axial motion of said expansion plunger, said sleeve having an internal thread engaging said thread formed on said plunger, and said sleeve having a polygonal portion connected to said drive shaft, and a pin passing through said expansion plunger between said internal thread of said sleeve and said expansion sleeve, said pin having ends projecting beyond the periphery of said expansion plunger and being guided in a slot formed in said other holding element.

4. Steam generator according to claim 3, wherein said drive means comprises a compressed air motor, and the clamping element includes a coupling flange connected to the tubular column by said coupling means, said coupling flange includes a collar extended into the tubular column carrying said compressed air motor, and including a nut connecting said other holding element to said coupling flange said nut extending beyond said slot formed in said other holding element.

5. Steam generator according to claim 1, wherein said clamping jaws have outer tapered surfaces with a given inclination, said holding element has a maximum outer diameter which is smaller than the inner diameter of a tube, and said holding element has a region overlapping said ends of said clamping jaws having an inner tapered surface having said given inclination.

* * * * *